(12) United States Patent
Liang

(10) Patent No.: US 7,958,265 B2
(45) Date of Patent: Jun. 7, 2011

(54) CODING METHOD OF VECTOR NETWORK ADDRESS

(75) Inventor: Mangui Liang, Beijing (CN)

(73) Assignee: Beijing Jiaotong University, Beijing (CN)

( * ) Notice: Subject to any disclaimer, the term of this patent is extended or adjusted under 35 U.S.C. 154(b) by 69 days.

(21) Appl. No.: 12/304,435

(22) PCT Filed: Jun. 8, 2007

(86) PCT No.: PCT/CN2007/001822
§ 371 (c)(1),
(2), (4) Date: Apr. 23, 2009

(87) PCT Pub. No.: WO2007/147328
PCT Pub. Date: Dec. 27, 2007

(65) Prior Publication Data
US 2009/0254637 A1 Oct. 8, 2009

(30) Foreign Application Priority Data
Jun. 16, 2006 (CN) .......................... 2006 1 0089302

(51) Int. Cl.
*G06F 15/16* (2006.01)
(52) U.S. Cl. ........ 709/245; 709/230; 709/238; 709/242; 370/351; 370/389
(58) Field of Classification Search .................. 709/220, 709/230, 238, 242, 245; 370/351, 389
See application file for complete search history.

(56) References Cited

U.S. PATENT DOCUMENTS

| 6,445,709 | B1 | 9/2002 | Chiang | |
| 6,847,637 | B1 * | 1/2005 | Abiven | 370/389 |
| 7,486,671 | B2 * | 2/2009 | Taipale et al. | 370/389 |
| 2002/0136202 | A1 * | 9/2002 | Droz et al. | 370/351 |
| 2005/0220100 | A1 * | 10/2005 | Kawabe | 370/389 |

FOREIGN PATENT DOCUMENTS

| CN | 1514605 A | 6/2004 |
| DE | 4023767 A1 | 3/1991 |
| JP | 90149045 A | 6/1997 |

OTHER PUBLICATIONS

International Search Report from PCT/CN2007/001822 dated Aug. 2, 2007.

* cited by examiner

*Primary Examiner* — Ramy M Osman
(74) *Attorney, Agent, or Firm* — Fay Sharpe LLP; Richard M. Klein

(57) ABSTRACT

A coding method of vector network address (VNA), which encodes the VNA according to output port names (OPN) of one source device and the forwarding devices along the Data Transmission Path (DTP). Each OPN acts as a component address, and all component addresses compose a sequence in the order along the direction of the DTP. This sequence is the result of the coding method, i.e. the VNA. More specifically, the VNA is a finite sequence as follows: The first component address in the sequence is the OPN of the source device, the second that is the OPN of the first forwarding device in the DTP, the third that is the OPN of the second forwarding device in the DTP, and so on. The final OPN in the sequence is the OPN of the final forwarding device in the DTP.

18 Claims, 2 Drawing Sheets

CODING METHOD OF VECTOR NETWORK ADDRESS

FIELD OF THE INVENTION

This invention relates to a coding method for electronic device address in communication network.

BACKGROUND OF THE INVENTION

In order to perform tasks of electronic devices well or better, the electronic devices need to be connected with each other with cable or communication line to form a network, so as to set up communication relationship, and to exchange information to collaborate their work. Functionally, an electronic device in the network can be categorized either as a termination device or a forwarding device. The termination device is used for sending and receiving information. Further, a termination device is called a source device when it plays role of sending information, or the termination device is called a destination device when it is used for receiving information. A forwarding device is an intermediate device used for forwarding information and it forwards information in the process of delivering information from source device to destination device. For instance, IP router in IP network and ATM (Asynchronous Transfer Mode) switch in ATM network are both examples of forwarding devices.

The above means that an electronic device may play three roles in the process of data transmission: the source device, the forwarding device and the destination device. In fact, the same electronic device can play different roles in different circumstances. For example, sometimes a forwarding device just receives data and doesn't forward the data out. It works as destination device at this moment. To make the description easy, it limits an electronic device to play a single role below. That means one electronic device must be only one of the roles of the source device, the forwarding device, and the destination device. In fact, the limitation does not affect generality of the method discussed. In order to communicate with each other after the electronic devices form a network, it is necessary to develop a coding method which is used to define an identifier for each electronic device, or they can't communicate. That identifier is called address of the electronic device.

IP address in IP network and VPI/VCI address in ATM network are addresses of electronic device commonly used. In the IP network, each electronic device is assigned an explicit and constant address. That is to say, coding method of absolute address is used and the address is called absolute address. The characteristic of the coding method of absolute address is that the destination device is one-variable function of absolute address. No matter when and where, once the absolute address is given, the destination device is determined. The relationship is shown as follows:

$$Dd = f(Aa)$$

Where,

Aa refers to the absolute address;

Dd refers to the destination device located by Aa; and f refers to an abstract function, denoting the relationship between Dd and Aa.

How about the performance of the coding method for network address can be appraised by the performance of the network established on this kind of network address, such as security, complexity, scalability, and so on. Problems of the insecurity, complexity, and un-scalability in IP network are mainly due to the coding method for network address in IP network, which is illustrated as follows.

Firstly, IP network is insecure. Three main reasons can be accounted for that.

(1) The destination address in a data packet must be visible directly to forwarding device (i.e. IP router). It can't be encrypted, or routers will not identify the destination address and can't forward data.

(2) Since length of IP address is fixed and limited, all possible IP addresses can be enumerated. That means all IP addresses can be searched to obtain, which may cause insecurity.

(3) Since a fixed address is assigned for an electronic device, once the address is acquired, anyone can access the electronic device from anywhere.

Secondly, the architecture of IP network is complex. An IP address is just the identification of an electronic device, and it doesn't contain routing information directly which is stored in a forwarding device for IP network. As the forwarding device is used by lots of users simultaneously, it is very complicated for the forwarding device to obtain and maintain dynamic routing information. Furthermore, it consumes a huge quantity of computing resources to access enormous routing information in a router, which makes the forwarding device in IP network need large storage space and high computing capability. Hence, IP router and the whole network as a result are high cost, and there may exist high speed bottleneck in IP network, restricting the application of the network.

Thirdly, the IP network architecture has poor scalability and adaptability. Reasons are as follows:

(1) The duplication of IP addresses is strictly not allowed. That means all addresses of electronic devices in the network can't be the same, so that it has to solve the duplication of names in the whole network range. A distribution system of network address is set up to solve the problem. That is to say, we can not expand the network arbitrarily and have to raise the procedure to apply an address before the expansion of the network, which is not convenient.

(2) The range of IP addresses is fixed. On the one hand, it has problem of address starvation for a large network. On the other hand, the long IP address is wasteful and brings an overhead relative big for small network.

SUMMARY OF THE INVENTION

To overcome the problems in the network techniques currently used, the object of this invention is to provide a coding method of vector network address. The result obtained by the coding method is called Vector Network Address (VNA).

Before describing this invention, it is necessary to define a term: Data Transmission Path (DTP).

Delivering data over a network means that the data is sent out from a source device and finally arrives at another destination device after the forwarding of a certain amount of forwarding devices. DTP is defined as a sequence of devices consisted of the source device, the forwarding devices and the destination device sequentially as the data goes through the network. The direction of DTP is the direction from the source device to the destination device.

The coding method of vector network address encodes VNA according to Output Port Names (OPNs) of the source device and the forwarding devices in the DTP. Each OPN acts as a component address and all component addresses compose a sequence in the order along the direction of the DTP. The sequence is the result of the coding method of vector network address, i.e. VNA. In more detail, it is as follows: the first component address in the sequence is the OPN of the source device, the second is the OPN of the first forwarding device in the DTP, the third is the OPN of the second forwarding device in the DTP, and so on. The final component address in the sequence is the OPN of the final forwarding device in the DTP.

There will be a unique VNA for a DTP, obtained by the coding method of vector network address. From the other point of view, once a source device acquires a VNA, it can locate a unique destination device, and The VNA defines a DTP through which the data goes.

The VNA is a kind of relative address, which means that we can say "what is the VNA from a source device to a destination device", but we can't say "what is the VNA of a given destination device". In other words, a destination device is a double-variable function of the VNA and the source device in the case of the coding method of vector network address. Destination device is definite only when the VNA and the source device are both given. The relationship is shown as follows:

$$Dd=g(Sd,VNA)$$

Where Dd refers to destination device, Sd refers to source device, VNA refers to Vector Network Address, and g refers to the abstract function defining the relationship among Dd, Sd, and VNA. The VNA has no meaning and can't be used to locate a destination device if there is no a source device as reference.

In order to send data from a source device to a destination device, it is enough that the VNA is given in data packet. There is no need to contain the name of source device in the data packet. The source device is the sender of the data packet, and it is not necessary to provide its name obviously in the data packet for sending.

The positive effect of this invention is that it makes the network of electronic devices simpler, more secure, and more scalable than before. The specific benefits are as follows:

(1) The network based on the coding method of vector network address has better security. The network is improved essentially in security comparing to the IP network based on IP address. That comes from the characteristics of VNA below:
  (i) The resulted address is relative. A source device can locate a destination device using VNA, but another source device cannot find the same destination device by the same VNA.
  (ii) The resulted address is unreadable. The number of component addresses in a VNA and the domain of each component address are not fixed. Therefore, in the network, there is no an electronic device which can read and understand the whole VNA. An electronic device in the DTP can only understand the component address belongs to itself, and all other component addresses can't be understood or are unavailable to the electronic device.
  (iii) The resulted address is un-enumerable. Both the number of component addresses in a VNA, and the domain of each component address are not fixed and don't have an upper limit, so it is impossible to search the address of an electronic device by enumerating all addresses. Even a small network based on VNA can have unlimited component addresses due to the property of unlimited values of VNA.
  (iv) The resulted address is able to encrypt. The VNA consists of component addresses. And individual electronic device forwards data relying on only one component address so that other component addresses can be in the status of encryption.

(2) The network is relatively simple. VNA provides routing information directly, which makes very easy for the forwarding device to forward data and simplifies the forwarding device. On the contrary, the IP address does not provide routing information directly and it requires the forwarding device to collect and maintain routing information, which consumes a lot of computing resources and makes forwarding device very complex.

(3) The coding method is of good adaptability and high efficiency. The network based on VNA can be extended whenever it is needed. And there is no the address-duplicate limitation strictly. The length of network address is determined on demand and it is unlimited. VNA is adequate to any-sized network and won't be used up. On the other hand, the length of network address is very short for small network and the overhead of data transmission due to address is very low consequently. That means the usage of communication link is very efficient.

DETAILED DESCRIPTION OF THE INVENTION

The data transmitted in network is called packet (or data packet). In order to demonstrate the coding method of vector network address, we firstly give an instance of packet format and an instance for forwarding method of forwarding device, and then how the VNA provides forwarding information in the forwarding device to implement forwarding operation for a packet is explained. Finally, the characteristic of VNA is presented.

The format of packet is as follows.
Head Len1 VNA Info
Where,
  Head: the packet head as the fixed information part of the packet, including a version number of the packet format, and priority of the packet, etc.
  Len1: an integer which represents the number of bits after field Len1 itself in the packet.
  VNA: vector network address.
  Info: payload of the packet.
Forwarding method is as follows.

The procedure transmitting a packet from source device to destination device can be divided into a series of forwarding procedures performed in each electronic device along the DTP. The method for forwarding procedure is called forwarding method. The forwarding method is very simple in the case of VNA: an electronic device forwards the packet to the next electronic device through a given output port.

Figure 3:
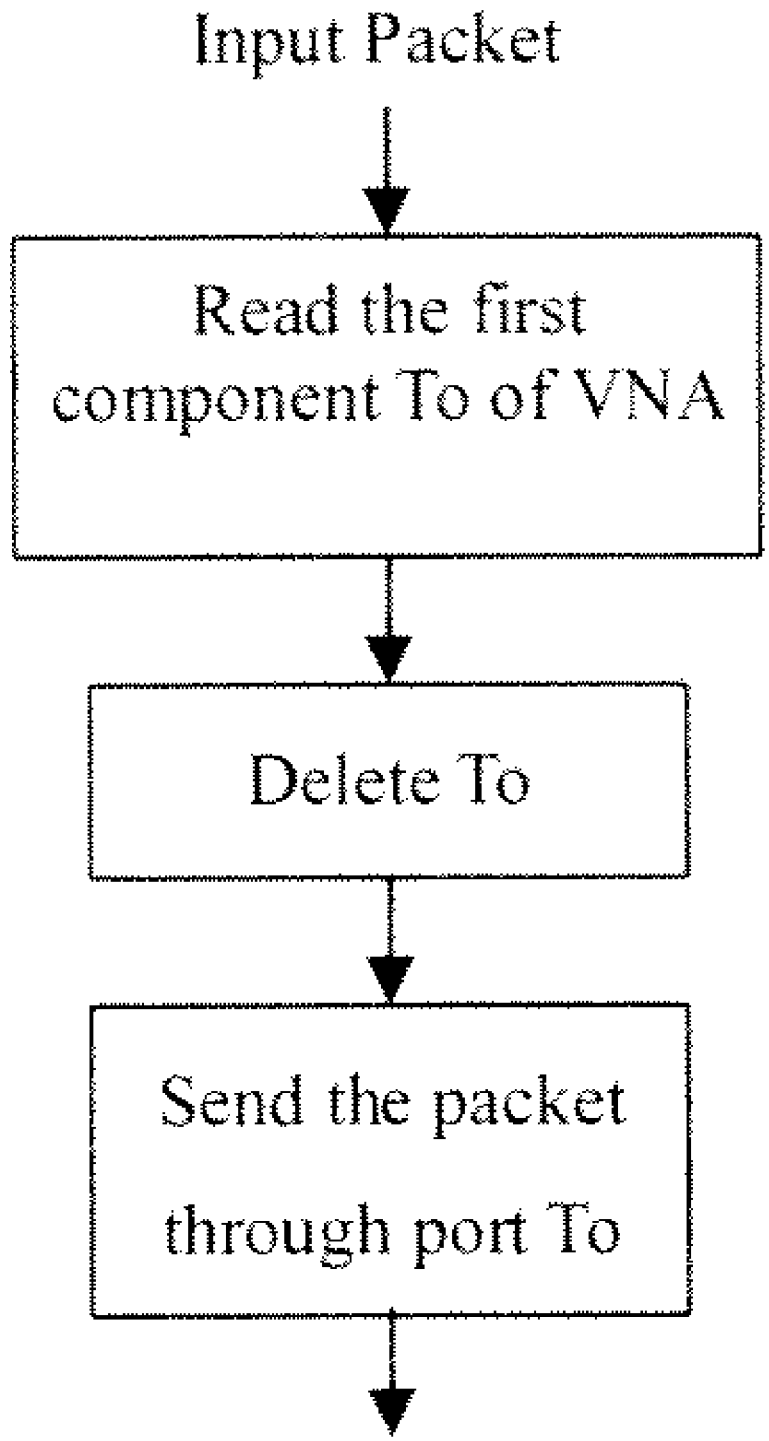
FIG. 3 is the flow chart of the forwarding program running in a forwarding device.

The flow chart of the program running in forwarding device is shown in FIG. 3. It gives the steps in detail of the forwarding method. This program runs in every forwarding device. When the forwarding device receives a packet from its input port, the program runs a time to perform forwarding data. There are only three steps for the forwarding procedure:

(i) Extracting the output port (denoted by To) from the field VNA of the packet, i.e. the first component address in the field VNA, to which the packet will be sent out;
(ii) Modifying the packet to delete To from the packet; and (iii) Sending the modified packet to the output port given by To.

With the packet format and routing method mentioned above, two instances implementing the coding method of vector network address are given as follows.

1. The Coding Method of Vector Network Address Based on Port Name (1) Coding Method The first instance of the method can be shown in FIG. 1, in which all the rectangles and the circles represent electronic devices, but the two kinds of electronic devices are different in function. The rectangles represent the termination devices which are devices sending and receiving information, and the circles represent forwarding devices. The dotted and closed curve represents the border of the network. All forwarding devices are inside the border, and all termination devices are outside the border. The figure shows ten electronic devices and their links between. What illustrated by the figure is just an example, and in practice the number of electronic devices, the number of ports for each electronic device, and the links of electronic devices will differ with application. In order to make the description easier, each of the electronic devices has been assigned a name, i.e. A, B, C, up to J. Each port of the electronic devices has been labeled by a port name, such as the three ports of E were labeled as E1, E2, and E3. The port name can be any string, including number as a special case of string.

The coding method of vector network address encodes VNA according to Output Port Names (OPNs) of the source device and the forwarding devices along the DTP. Each OPN acts as a component address and all component addresses compose a sequence in the order along the direction of the DTP. The first component address in the sequence is the OPN of the source device, the second component address in the sequence is the OPN of the first forwarding device in the DTP, the third component address in the sequence is the OPN of the second forwarding device in the DTP, and so on. The final component address in the sequence is the OPN of the final forwarding device in the DTP. The sequence above is the result of the coding method, i.e. the VNA.

Figure 1:
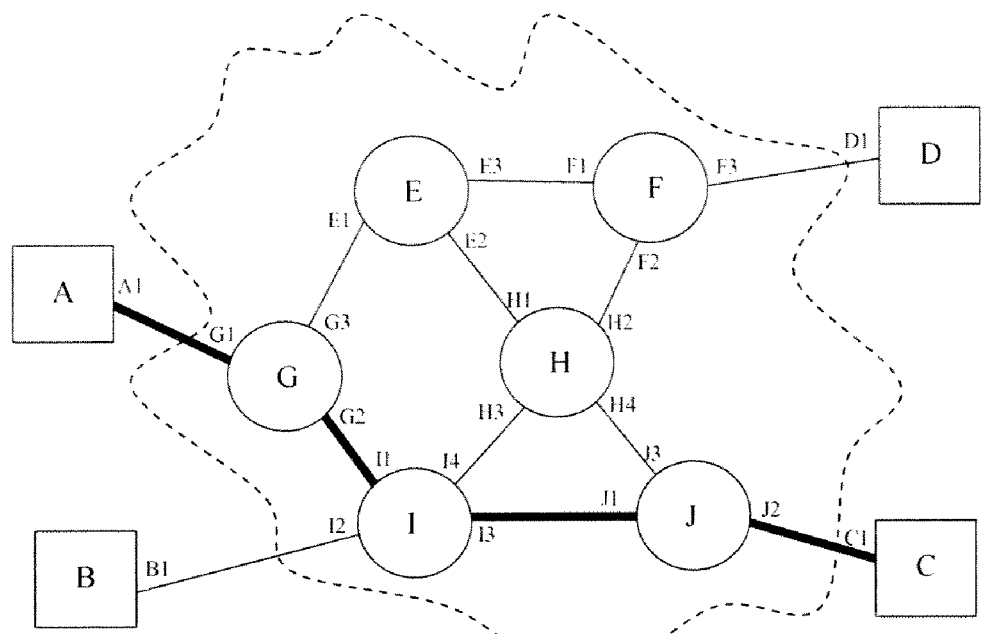
FIG. 1 is an illustration of output port names.

Take the path represented by thick solid lines in FIG. 1 as an example. according to the coding method of vector network address mentioned above, a coding result of vector network address for transmitting data from the source device A to the destination device C can be obtained.

The first component address of the sequence is A1 which is the output port name of the source device A; the second component address is G2 which is the output port name of the first forwarding device G on the DTP; the third component address is I3 which is the output port name of the second forwarding device I; and so on. The last component address of the sequence is J2 which is the name of the last forwarding device J. The sequence {A1, G2, I3, J2} is the coding result of vector network address, and it is the VNA by which data can be transmitted from source device A to destination device C. Once the VNA {A1, G2, I3, J2} is given, a path from A to C is completely determined without any ambiguity. The characteristic of the coding method is that destination device C which can be determined only after a source device A and the VNA are both given is a double-variable function of the source device A and the VNA {A1, G2, I3, J2}, which can be expressed as follows:

$$C=g(A,\{A1,G2,I3,J2\})$$

Where, g is an abstract function, expressing the relationship among the destination device, the source device, and the VNA. The VNA has no meaning and can't be used to locate the destination device if there is no source device as a reference.

Other VNA can easily be obtained similarly using the coding method of vector network address, for example, {B1, I4, H2, F3} is one of VNA from B to D when B is the source device and D is the destination device; {D1, F2, H3, I2} is one of the VNA from D to B, and {D1, F1, E1, G2, I2} is another one when D is the source device and B is the destination device. There are many vector network addresses from a source device to a destination device, and however only one destination device will be exactly located by one source device and one vector network address.

(2) An Instance of Forwarding Process

This forwarding process is denoted as "Instance 1".
packet is sent from the source device A. The VNA of the packet is VNA={A1, G2, I3, J2}. That is, the packet has the form:
[Head Len1 {A1, G2, I3, J2} Info]

The procedure of forwarding program in the forwarding devices is described as follows:

(a) The forwarding program in source device A strips off the first component address A1, and let To=A1. As a result, the packet becomes
[Head Len1 {G2, I3, J2} Info]
Then, the modified packet is sent to forwarding device G through the output port A1 of the source device A, referring to FIG. 1.

(b) When the packet gets to the forwarding device G, the forwarding program in G also strips off the first component address G2 from the current VNA of packet and let To=G2, the packet becomes
[Head Len1 {I3, J2} Info]
Then, the modified packet is sent to forwarding device I through the output port G2 of the forwarding device G, referring to FIG. 1.

(c) When the packet gets to the forwarding device I, the forwarding program in I strips off the first component address I3 from the current VNA of packet and let To=I3, the packet becomes
[Head Len1 {J2} Info]
Then, the modified packet is sent to forwarding device J through the output port I3 of the forwarding device I, referring to FIG. 1.

(d) When the packet gets to the forwarding device J, the forwarding program in J strips off the first component address J2 from the current VNA of packet and let To=J2, the packet becomes
[Head Len1 { } Info]
Then, the modified packet is sent to destination device C through the output port J2 of the forwarding device J. At this point, the whole process of data transmission is completed.

2. The Coding Method of Vector Network Address for the Binary Form of the VNA (1) Coding Method To make the issue more concrete and to explain the implementation clearly, it supposes that all electronic devices are computer, and all the computers are connected with Ethernet lines to form a computer network. Each termination device has an Ethernet interface card, and each forwarding device has certain number of interface cards corresponding to the number of its ports.

Figure 2:
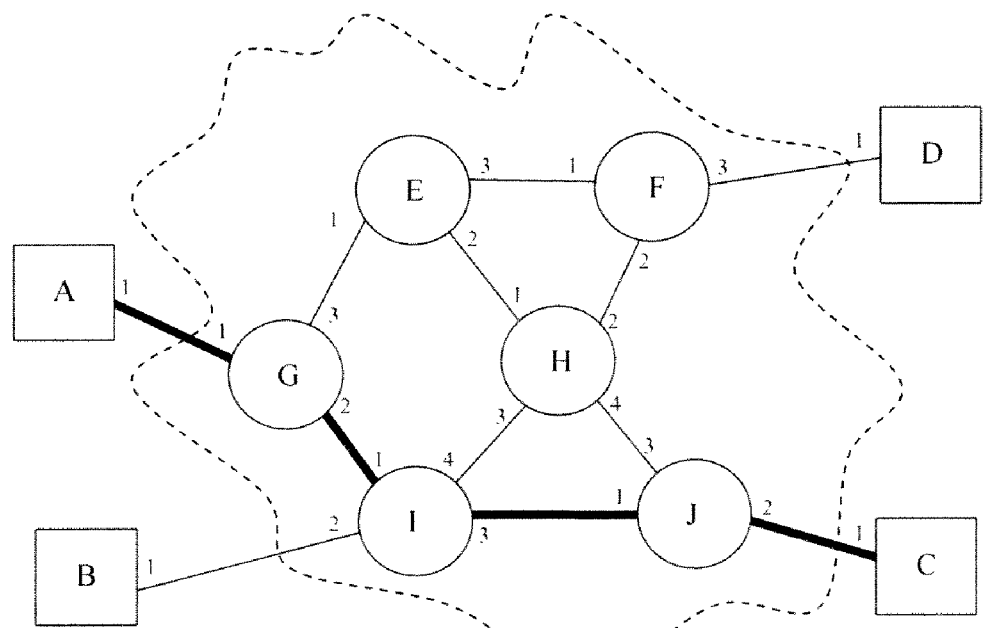
FIG. 2 illustrates ordinal number coding of output ports.

Ordinal numbers for the ports are shown in FIG. 2, which is a more specific example of FIG. 1. The lines and shapes in this FIG. 2 have just the same meaning as those in FIG. 1, but the port name of electronic devices is more specific and it is replaced by output port number. That is, the letter of port name is removed and the digit is left alone. For example, B1 in FIG. 1 is replaced by 1 in FIG. 2, so the expression of VNA is more concise.

FIG. 2 shows the result after carrying out the operation mentioned above. The expression of VNA becomes {1, 2, 3, 2} instead of {A1, G2, I3, J2}.

Further, for the purpose of representing VNA more efficient in computer, the VNA {1, 2, 3, 2} will be represented by binary numbers. The representation is explained as follows:

Firstly, the number of ports for each electronic device in DTP are different and they are 1, 3, 4, and 3 for the four electronic devices A, G, I, and J, respectively. According to the numerical range which can be expressed by a binary number, the binary number for the electronic device A can be expressed by only 1 bit because it has just 1 port; similarly, the binary numbers for the electronic device G can be expressed by 2 bits because it has 3 ports; the binary numbers for the electronic device I should be expressed by 3 bits because it has 4 ports; and the binary numbers for the electronic device J should be expressed by 2 bits because it has 3 ports.

According to what mentioned above, we can use 1, 2, 3, 2 bits for the four electronic devices A, G, I, and J respectively, which are enough to code their ports, and the binary numbers obtained for the VNA are as follows respectively:

| Decimal numbers: | {1 2 3, 2} |
|---|---|
| Binary numbers: | {1, 10, 011, 10} |
| Number of bits: | 1 2 3 2 |

Therefore, the final expression of the VNA in binary form is 11001110 from the steps below,

{A1, G2, I3, J2}=>{1, 2, 3, 2}=>{1, 10, 011, 10}=>11001110

Where all component addresses in the binary form are directly concatenated together to form the VNA without need for explicit or implicit delimiter between. Once the VNA in binary form is formed, it is impossible to trip off the first component address from the VNA if the length of the component address is unknown.

(2) Instance of Forwarding Process

This forwarding process is denoted by "Instance 2".

This instance is the same as "Instance 1" except that the VNA is in the binary form. The packet which is with VNA 11001110 will be sent from the source device A and the packet is in the form:

[Head Len1 11001110 Info]

The procedure of forwarding program in each forwarding device is described as follows:

(a) The source device A knows that it has only one port and also knows that the length of its component address is 1 bit. So the forwarding program in source device strips off just 1 bit from the VNA of the packet and let To=1 because the bit stripped off is 1. As a result, the packet becomes

[Head Len1 1001110 Info]

Then, the modified packet is sent to forwarding device G through the output port 1 of the source device A, referring to FIG. 2.

(b) The forwarding device G knows that it has only three ports and it also knows that the length of its component address is 2 bits. When the packet is received, the forwarding program strips off the first component address 10, 10 in binary means 2 in decimal and let To=2. As a result, the packet becomes

[Head Len1 01110 Info]

Therefore, the modified packet is sent to forwarding device I through the output port 2 of the forwarding device G, referring to FIG. 2.

(c) The forwarding device I knows that it has only four ports and it also knows that the length of its component address is 3 bits. When the packet is received, the forwarding program strips off the first component address 011, 011 in binary means 3 in decimal and let To=3. As a result, the packet becomes

[Head Len1 10 Info]

Therefore, the modified packet is sent to forwarding device J through the output port 3 of the forwarding device I, referring to FIG. 2.

(d) The forwarding device J knows that it has only three ports and it also knows that the length of its component address is 2 bits. When the packet is received, the forwarding program strips off the first component address 10, 10 in binary means 2 in decimal and let To=2. As a result, the packet becomes

[Head Len1 { } Info]

Therefore, the modified packet is sent to destination device C through the output port 2 of the forwarding device J, referring to FIG. 2.

At this point, the whole process of data transmission is completed.

The Characteristics of VNA.

Based on the instances of forwarding process mentioned above, the characteristics of VNA are summarized below.

(1) The VNA is with unlimited values. The number of VNA from a source device to a destination device is not just one but unlimited. As shown in FIG. 1, the VNA from A to C could be:

{A1, G2, I3, J2}, {A1, G2, I4, H4, J2}, {A1, G3, E2, H4, J2}, {A1, G3, E2, H3, I3, J2}, {A1, G3, E2, H3, I1, G3, E2, H4, J2}, . . . .

Obviously, the first address is the shortest and the last one is the longest among the five addresses because its components G3 and E2 are looped. There could be unlimited local cycles in a path of network, so the number of VNAs from A to C is also unlimited. In practice, we usually select the shortest or the approximately shortest path. The property of looping may be useful to the security.

(2) The VNA is unreadable. From the "Instance 2" we can see that a forwarding device can just analyze the component address belonging to it. For example, as the component address '1' is already stripped off by the previous device, the forwarding device G can only acquire the address 1001110. In addition, the forwarding device G knows that the length of its component address is 2 bits so that the component address '10' can be obtained. But it can't understand the rest address "01110", which may be various combinations: 01+110, 011+10, 01+1+10, so that the forwarding device G doesn't know how to divide the rest address and it is impossible for G to understand the rest address. In a word, the forwarding device G can only get and understand the component address '10' belonging to it. The component addresses before are not available and the component addresses after cannot be understood.

(3) The VNA is able to encrypt. We can encrypt the VNA even though the length of the component address is unchanged. As long as a forwarding device in the DTP knows how to decrypt its own component address, it can perform task of data forwarding correctly. As long as a source device gets secret keys for every forwarding device in the DTP by consulting with all of them before communication begins, the communication with addresses encrypted can be implemented. Considering the VNA is unreadable as well, we can conclude that the VNA has the excellent ability of encryption communication. Not only data can be encrypted, but also who are communicating does not expose.

(4) The VNA is very short for the small network. The number of component addresses is related directly to the number of forwarding devices in the network, and the number of bits for component address is related directly to the number of output ports of each electronic device. If the network is small, the number of forwarding devices and/or the number of output ports of each forwarding device are small, so that the number of component addresses and/or the number of bits for each component address are small. That means the address is short.

The invention claimed is:

1. A method for processing a vector network address (VNA), comprising:
   receiving a data packet containing a VNA having a sequence of output port names (OPNs) into computer memory of an electronic device;
   extracting an OPN for the electronic device from the VNA;
   modifying the data packet to delete the OPN from the VNA; and
   sending the modified data packet to the output port identified by the OPN;
   wherein only a single OPN of the VNA is capable of being read by the electronic device; and
   wherein the remaining OPNs in the VNA are encrypted in a manner such that the electronic device is incapable of determining the remaining OPNs in the VNA.

2. The method of claim 1, wherein the VNA defines a data transmission path.

3. The method of claim 2, wherein the data transmission path is relative to the electronic device.

4. The method of claim 1, wherein the length of the VNA is based at least in part on the quantity of OPNs in the VNA and the variable length of each OPN.

5. The method of claim 1, wherein the VNA comprises a sequence of concatenated sequential OPNs in binary form without delimiters.

6. The method of claim 5, wherein each of the concatenated sequential OPNs in binary form is of variable length with respect to each electronic device.

7. The method of claim 6, further comprising:
   determining the length of the OPN within the VNA for the electronic device; and
   modifying the data packet by deleting a sequence of binary bits having a length equal to the determined length;
   wherein the determined length is the minimum number of bits necessary to represent any output port on the electronic device.

8. The method of claim 1, wherein the OPN identifies an output port on the electronic device connected to exactly one input port on a next electronic device.

9. The method of claim 1, wherein the final destination derived from the VNA is relative to the electronic device.

10. A method for transmitting a data packet from a source device to a destination device on a network, comprising:
   (a) receiving a data packet containing a vector network address (VNA) into computer memory of a source device, wherein the VNA includes a sequence of output port names (OPNs);
   (b) extracting an OPN for the source device from the VNA;
   (c) modifying the data packet to delete the OPN from the VNA; and
   (d) sending the data packet containing the modified VNA via the output port of the source device identified by the OPN to the next electronic device connected to the identified output port;
   wherein if the next electronic device is the destination device, the transmitting is finished; else if the next electronic device is a forwarding device, performing the following for the next electronic device:
      (e) receive the data packet containing the VNA into computer memory;
      (f) extract an OPN for the forwarding device from the VNA;
      (g) modify the data packet to delete the OPN from the VNA; and
      (h) send the modified data packet, via the output port identified by the OPN, to the further next electronic device connected to the identified output port; and
   if the further next electronic device is also a forwarding device, repeating steps (e), (f), (g) and (h) with respect to the modified data packet; otherwise the packet is at a final destination and the transmitting is finished;
   wherein only a single OPN of the VNA is capable of being read by each electronic device; and
   wherein the remaining OPNs in the VNA are encrypted in a manner such that the electronic device processing the data packet is incapable of determining the remaining OPNs in the VNA.

11. The method of claim 10, wherein the data packet is sent to a same forwarding device at least two times before reaching the destination device.

12. The method of claim 10, wherein the VNA defines a data transmission path; and
   wherein the data transmission path is relative to the source device or forwarding device receiving the data packet.

13. The method of claim 10, wherein the VNA comprises a sequence of concatenated sequential OPNs of variable length in binary form without delimiters.

14. The method of claim 13, further comprising:
   at the source device or forwarding device, performing the following:
      (1) determine the length of the OPN within the VNA for the source device or forwarding device;
      (2) identify a sequence of binary bits in the VNA having a length equal to the determined length as the extracted OPN in binary form for the source device or forwarding device;
      (3) modify the data packet by deleting a sequence of binary bits having a length equal to the determined length of the OPN from the VNA;
   wherein the determined length of the OPN is the minimum number of bits necessary to represent any output port on the source device or the forwarding device.

15. The method of claim 10, wherein the OPN identifies an output port on the source device or forwarding device processing the OPN that connects to exactly one forwarding device or destination device.

16. A system for transmitting a data packet from a source device to a destination device on a network, comprising:
   a plurality of forwarding devices linked together to form a network, and a plurality of destination devices and source devices connected to the network;
   wherein the source device is adapted to:
      transmit a data packet containing a vector network address (VNA) having a sequence of sequential output port names (OPNs) on an output port of a source device to a forwarding device;

wherein the forwarding device is adapted to:

receive the data packet containing the VNA into computer memory;

extract an output port name (OPN) from the VNA;

modify the data packet to delete the OPN from the VNA; and send the modified data packet, via the output port identified by the OPN, to one of a destination device or a forwarding device connected to the identified output port;

wherein any single forwarding device on the network is capable of determining only a single OPN of the VNA; and wherein the remaining OPNs in the VNA are encrypted in a manner such that the single forwarding device is incapable of determining any of the remaining OPNs in the VNA.

17. The system of claim 16, wherein the VNA within the data packet defines a data transmission path.

18. The system of claim 16, wherein the forwarding device is further adapted to:

determine the length of the OPN within the VNA for the forwarding device; and modify the data packet by deleting a sequence of binary bits having a length equal to the determined length of the OPN;

wherein the determined length of the OPN is the minimum number of bits adequate to uniquely identify any output port on the forwarding device.

* * * * *